United States Patent
Werner et al.

[11] Patent Number: 5,979,041
[45] Date of Patent: Nov. 9, 1999

[54] APPARATUS FOR ASSEMBLING HEAT EXCHANGERS

[75] Inventors: Adolph C. Werner, Richmond; Randall B. Parks, Liberty; Steven J. LaMont, Williamsburg; Robert E. White; James A. Zoellner, both of Richmond, all of Ind.

[73] Assignee: Ahaus Tool & Engineering, Inc., Richmond, Ind.

[21] Appl. No.: 08/841,263

[22] Filed: Apr. 29, 1997

[51] Int. Cl.[6] .................................................. B23P 15/26
[52] U.S. Cl. ................................... 29/726; 29/709; 29/721
[58] Field of Search .............................. 29/726, 709, 720, 29/721, 727

[56] References Cited

U.S. PATENT DOCUMENTS

| | | | |
|---|---|---|---|
| 3,657,044 | 4/1972 | Travis | 29/726 |
| 3,718,017 | 2/1973 | Blackburn | 29/726 |
| 4,180,897 | 1/1980 | Chester | 29/157.3 A |
| 4,200,424 | 4/1980 | Gerkey et al. | 29/726 |
| 4,228,573 | 10/1980 | Barnard | 29/157.3 R |
| 4,321,739 | 3/1982 | Martin et al. | 29/157.3 A |
| 4,486,933 | 12/1984 | Iwase et al. | 29/157.3 |
| 4,543,711 | 10/1985 | Wada et al. | 29/726 |
| 4,637,132 | 1/1987 | Iwase et al. | 29/726 |
| 4,652,200 | 3/1987 | Johnson | 29/726 |
| 4,860,421 | 8/1989 | Breda et al. | 29/157.3 |
| 4,873,753 | 10/1989 | Kiesche et al. | 29/726 |
| 4,898,232 | 2/1990 | Ochiai et al. | 165/151 |
| 4,900,328 | 2/1990 | Breda et al. | 29/890.039 |
| 4,901,414 | 2/1990 | Breda et al. | 29/890.04 |
| 4,901,416 | 2/1990 | McKinney | 29/726 |
| 5,226,234 | 7/1993 | Beddome et al. | 29/890.039 |
| 5,479,707 | 1/1996 | Alvarez et al. | 29/890.039 |
| 5,562,153 | 10/1996 | Sasaki | 165/76 |

*Primary Examiner*—I Cuda
*Attorney, Agent, or Firm*—Woodard, Emhardt, Naughton, Moriarty & McNett

[57] ABSTRACT

An apparatus for assembling a heat exchanger includes a dispenser head that dispenses heat exchanger components onto a receiving fixture as the dispenser head traverses across the receiving fixture. The components are dispensed at predetermined positions along the fixture. The components are ejected from the dispenser head at a predetermined velocity. The dispenser is quickly reloaded with the next component. The rate of reloading, predetermined velocity, and predetermined positions measured and controlled by an electronic controller.

43 Claims, 5 Drawing Sheets

APPARATUS FOR ASSEMBLING HEAT EXCHANGERS

BACKGROUND OF THE INVENTION

The present invention relates generally to the field of assembly of heat exchangers, and more particularly to heat exchangers of a flat shape. However, certain applications may be outside of this field.

Heat exchangers are used in many applications where heat is rejected from a source and absorbed by a sink. For example, automobiles, trucks and buses utilize heat exchangers to reject heat from the engine, air conditioning, and transmission, and also to have heat absorbed by the passenger compartment. The heat exchangers are sometimes configured as an alternating array of tubes and fins. Headers, or collectors, unite the tubes in fluid communication. These heat exchangers may be substantially planar.

To keep the cost of these heat exchangers low, it is necessary to automate certain aspects of their construction. In one example of such automation, a machine utilizes a translating platform to dispense flattened tubes in a substantially downward direction onto positions on a receiving fixture. A motor drives both the platform and a dispenser attached to the platform by a combination of mechanical links such as rack and pinion gears and chains and sprockets. The action of the dispenser to eject tubes is mechanically linked to translation of the platform across the receiving fixture. For example, relatively slow translation of the platform results in relatively slow ejection of tubes. Also, the positions at which tubes are deposited is determined by the mechanical linkage. Changing the predetermined positions of the tubes on the receiving fixture requires changing the mechanical linkage.

A drawback of this machine is in the time and cost required to change the predetermined positions at which the tubes are ejected onto the receiving fixture, also known as the pitch of the tubes. A gearset of the machine must be changed, which requires a partial teardown of the machine, with subsequent rebuild and realignment. Another drawback of this machine is the difficulty encountered in speeding up the machine to increase throughput of assembled heat exchangers. As the machine speed of translation is increased, the velocity with which the tubes are ejected increases. With high ejection velocity, the tubes bounce out of location on the receiving fixture, requiring attention from the human operator before assembly can be resumed.

There are other examples of machines and methods for assembling heat exchangers. Some of this related art can be found in the following U.S. Pat. Nos.:

| Patentee | Patent No. |
| --- | --- |
| Iwase et al. | 4,637,132 |
| Iwase et al. | 4,486,933 |
| Breda et al. | 4,900,328 |
| Breda et al. | 5,029,382 |
| Breda et al. | 4,860,421 |
| Beddome et al. | 5,226,234 |
| Barnard | 4,228,573 |
| Kiesche et al. | 4,873,753 |
| McKinney | 4,901,416 |
| Ochiai et al. | 4,898,232 |
| Sasaki | 5,562,153 |
| Chester | 4,180,897 |
| Alvarez et al. | 5,479,707 |
| Martin et al. | 4,321,739 |

What is needed is an improved method and apparatus for assembling heat exchangers.

SUMMARY OF THE INVENTION

The present invention includes an apparatus for assembling a heat exchanger, comprising a plurality of components for a heat exchanger; a fixture for receiving the components; a means for dispensing the components onto the fixture, the dispensing means being traversable across the fixture; and an electronic controller operably coupled to the dispensing means such that the components are dispensed onto the fixture at predetermined positions, wherein the predetermined positions are electronically changeable. In another aspect of the present invention, the components are tubes.

One object of the present invention is to provide an improved apparatus for assembly of heat exchangers.

These and other objects of the present invention will be apparent from the drawings and description of the preferred embodiment.

DESCRIPTION OF THE PREFERRED EMBODIMENT

Figure 1:
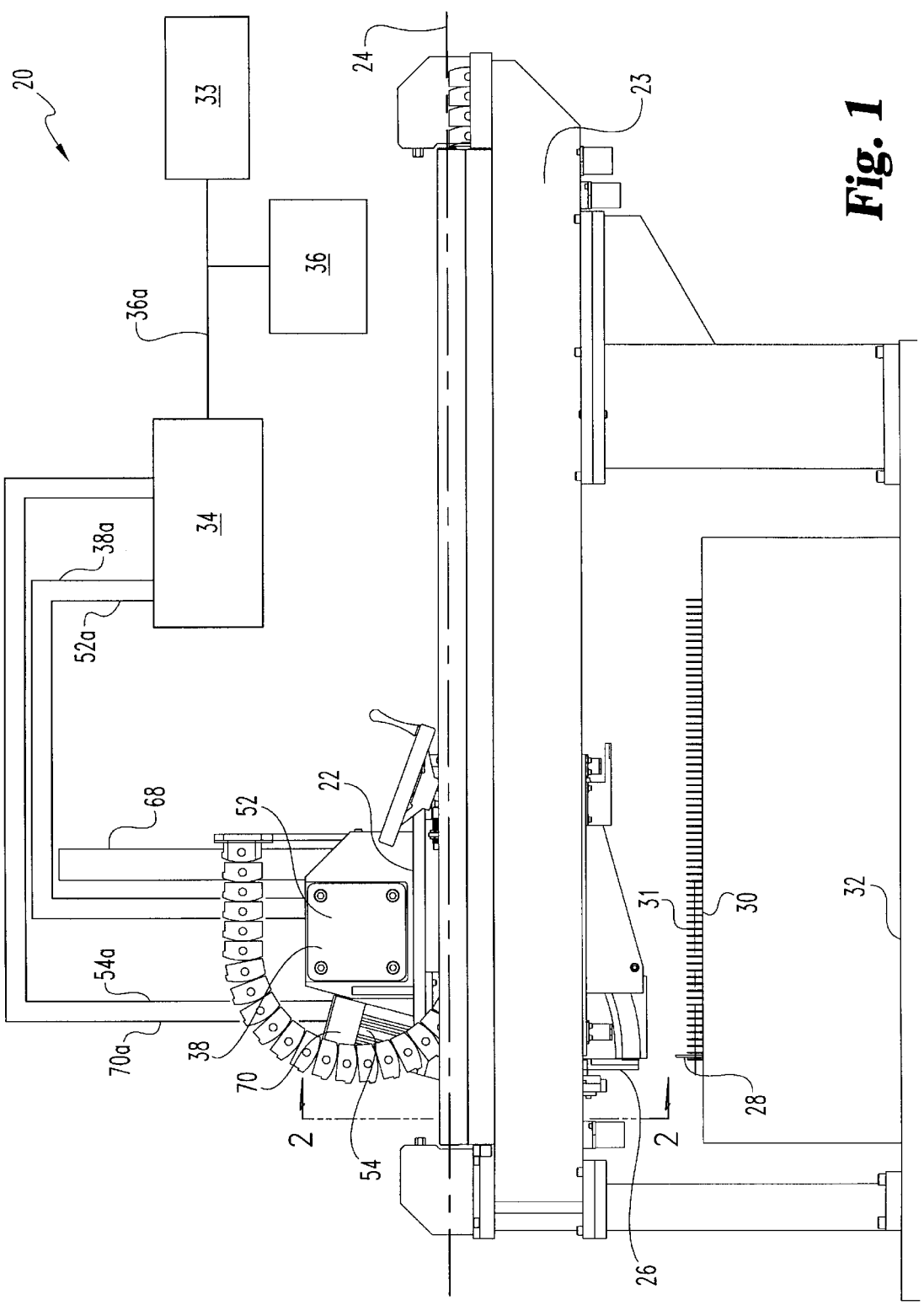
FIG. 1 is a side view of an apparatus useful with the present invention.

For the purposes of promoting an understanding of the principles of the invention, reference will now be made to the embodiments illustrated herein, and specific language will be used to describe the same. It will nevertheless be understood that no limitation of the scope of the invention is thereby intended.

The present invention relates to an apparatus and a method for building heat exchangers. FIGS. 1–4 depict apparatus 20, the preferred embodiment of the present invention. A platform 22 supported by structure 23 is traversable along a path 24. A dispenser head 26 is attached to platform 22 and dispenses heat exchanger component 28 onto a receiving fixture 30 as platform 22 translates along path 24. In the most preferred embodiment, component 28 is a flattened, elongated tube which ultimately carries within it a fluid of the finished heat exchanger.

Receiving fixture 30 may be of any type capable of maintaining a predetermined spacing between components 28. In the most preferred embodiment, receiving fixture 30 incorporates a plurality of upright pickets 31. Picket fixture 30, shown in FIG. 1 in the expanded, open-pitch state, is capable of being collapsed to a closed-pitch state by means of an actuator (not shown) in a direction parallel to path 24. For example, in the open-pitch state, the distance between adjacent pickets 31 may be about 0.531 inches. In the closed-pitch state, the distance between adjacent pickets 31 is about 0.427 inches.

FIG. 1 depicts platform 22 at a location along path 24 closest to a human operator. As platform 22 traverses along path 24 toward the right of FIG. 1, platform 22 moves away from the human operator. The position closest to the operator is called the advanced position, whereas the position furthest from the human operator is referred to as the return, or home, position. Apparatus 20 is attached to a grounding structure 32. In the most preferred embodiment, both path 24 and receiving fixture 30 are parallel and inclined at a 15 degree angle. The return position is higher than the advanced position. In this way, it is easier for an operator to perform work on components 28 that have been deposited on receiving fixture 30.

An electronic controller 34 controls the action of both platform and dispenser 26, based on data and commands received from operator display and input panel 36 through connection 36a, and also based on data and commands resident within software 100. In the preferred embodiment, electronic controller 34 is a programmable, digital-type incorporating various types of memory (including RAM and ROM), a central processing unit or its equivalent for performing a programmed set of commands, and input and output structure for receiving commands and driving appropriate output devices, respectively. In the most preferred embodiment, electronic controller 34 is a Model 1394 manufactured by Allen Bradley. A second electronic controller 33, a programmable logic controller, is in communication via connection 36a with both panel 36 and controller 34. Controller 33 controls certain movements of fixture 30. Although specific types of controllers 33 and 34 have been disclosed, those of ordinary skill in the art will recognize the applicability of other types of controllers.

Figure 2:
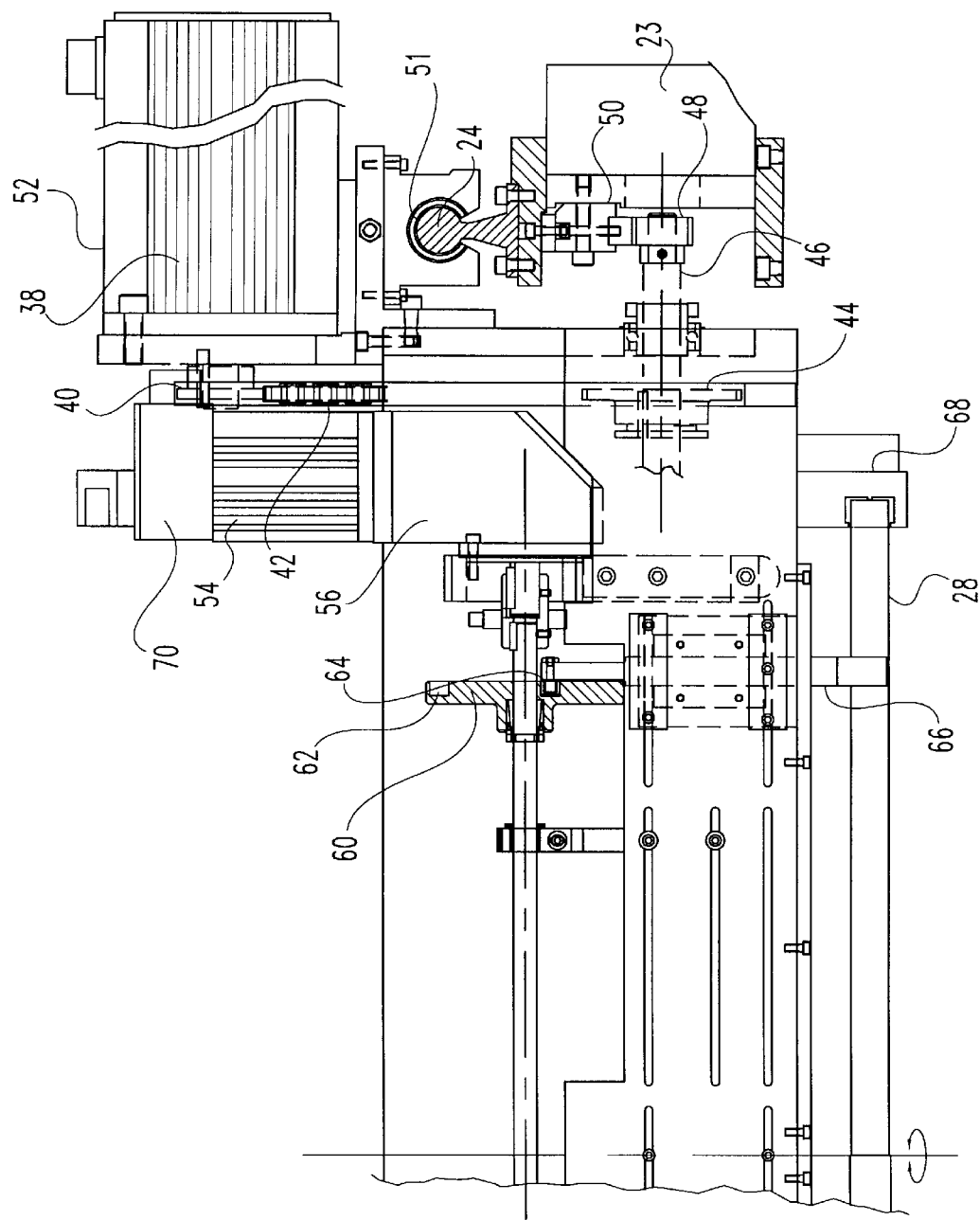
FIG. 2 is a view of FIG. 1 taken along line 2—2, from one side of the apparatus to the centerline of the apparatus.
Figure 4:
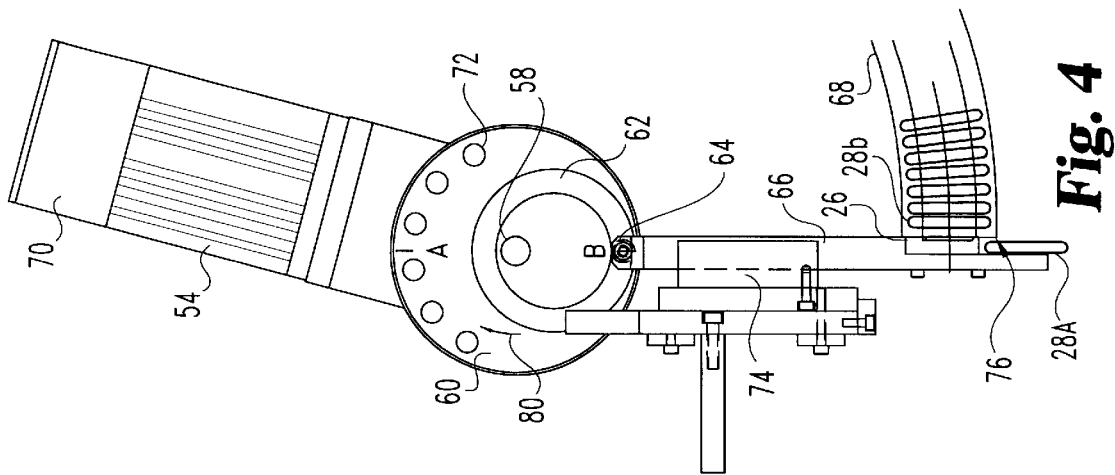
FIG. 4 is a view of the ejecting mechanism of FIG. 3, with the mechanism in the ejecting, or releasing, position.

Electronic controller 34 controls translating motor 38 via signals along connection 38a. First sprocket 40 is attached to the output shaft of motor 38 and drives chain 42, which in turn drives second sprocket 44. Second sprocket 44 is attached to drive shaft 46. Drive shaft 46, as shown in FIG. 2, extends across much of the width of apparatus 20. At both of its ends shaft 46 has attached to it a pinion gear 48. Each gear 48 drives a rack gear 50. Each rack gear 50 is attached to the static structure of apparatus 20. Rotation of motor 38 ultimately results in rotation of drive shaft 46 and pinion gears 48. Rotation of gears 48 along rack gears 50 result in translation of platform 22 along path 24. Guide bar and socket 51 maintain platform 22 moving along path 24.

Controller 34 senses the position of platform 22 along path 24 by a sensor 52 incorporated in motor 38. Sensing signals are provided by connection 52a. In the most preferred embodiment, sensor 52 is a resolver that provides a plurality of electrical pulses for each revolution of servo motor 38. The timing between consecutive pulses of resolver 52 can be related to a finite movement of platform 22 by taking into account the drive relationship of sprockets 40 and 44 and the characteristics of gears 48 and 50. In the most preferred embodiment, the spacing between consecutive pulses of resolver 52 translates into a movement of approximately 0.0006 inches of platform 22. Although sensors 52 and 70 are resolvers in the most preferred embodiment, those of ordinary skill in the art will recognize the usefulness of other types of sensors, including other rotational and linear position sensors, as well as other types of sensors from which position data can be inferred.

Controller 34 also controls the action of dispenser head 26 through dispenser motor 54. Motor 54 drives dispenser shaft 58 through gear box 56. Attached to shaft 58 is wheel 60, which has within it cam path 62. Cam follower 64 resides within cam path 62. Path 62 is not concentric about shaft 58. Balance holes 72 assist in balancing wheel 60. Follower 64 is rotatable within path 62. Dispenser arm 66 is rotatably attached to follower 64. Dispenser head 26, shaped to accommodate component 28, is attached to an end of dispenser arm 66. The motion of arm 66 is constrained to sliding in the vertical direction between linear bearing vertical guide 74 and face 76 of magazine 68. A second, mirror-image ejecting mechanism is located on the left side of apparatus 20 (not shown). It is driven by shaft 58.

Figure 3:
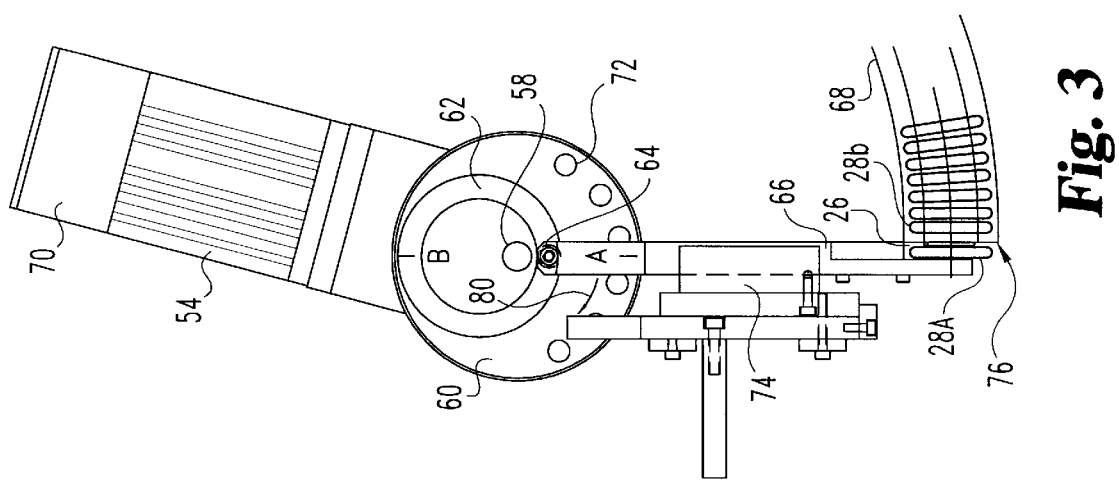
FIG. 3 is a view of an ejecting mechanism useful with the present invention, with the mechanism in the loaded position.

Arrow 80 indicates the direction of rotation of wheel 60. FIG. 3 shows wheel 60 with index mark A centered at the bottom. Cam follower 64 is within path 62 at a point closest to shaft 58. As wheel 60 rotates, follower 64 follows path 62, moving dispenser arm 66 in a downward position. A first tube 28A loaded into dispenser head 26 also begins to move downward. As tube 28A is pushed downward and clear of magazine 68, tube 28A continues to fall into a predetermined position in receiving fixture 30. The ejection and release of tube 28A is complete by the time wheel 60 has rotated such that position B is centered at the bottom (see FIG. 4). At this point, follower 64 is also at a position furthest away from shaft 58.

With continued rotation of wheel 60, cam follower 64 and dispenser arm 66 will rise vertically until position A is again at the bottom of wheel 60. By this point, tube 28B located within magazine 68 is loaded into position in dispenser head 26 and is ready for the next component release by the ejecting mechanism.

The position of wheel 60 is known within controller 34 by sensor 70 attached to dispenser motor 54. In the most preferred embodiment, sensor 70 is a resolver. Resolver 70 provides a plurality of electronic pulses for each revolution of motor 54. These pulses are relayed through electrical connection 70a. There is a fixed relationship between rotation of wheel 60 and rotation of motor 54. In the most preferred embodiment, the spacing between consecutive pulses of resolver 70 corresponds to approximately 0.0176 degrees of motion of wheel 60. By including knowledge of cam path 62, it is possible to extend this relationship to linear motion of arm 66.

By operating wheel 60 in a variable speed manner, electronic controller 34 permits releasing of a component 28 at a predetermined velocity by turning wheel 60 at a first rate, and loading of the next component 28 into dispenser head 26 by turning wheel 60 at a second rate. The rate at which wheel 60 spins can be controlled in a variety of ways because of the versatility of electronic controller 34.

The predetermined release velocity imparted to component 28 is chosen to minimize the troublesome effects that arise from having too high of a velocity imparted to component 28. If component 28 is released with too high of a velocity, then it will bounce excessively after touching receiving fixture 30. Excessive bouncing of a component 28 results in misalignment of the component on fixture 30, unwanted lateral movement of component 28, or location of component 28 between the wrong pickets 31. Correction of these problems often requires attention from the human operator, which is additional labor expense and subsequent reduction in heat exchanger throughput. Also, excessive bouncing increases the noise level in the vicinity of apparatus 20, which unnecessarily fatigues the human operator.

In related art machines, the vertical movement of dispenser arm 66 is mechanically linked by gears, shafts, and chains to the translation of platform 22. Therefore, if it was desirable to increase the translation speed of platform 22 so as to increase the throughput of heat exchangers, the speed at which the dispenser head would move would also increase. Thus a higher velocity would be imparted to the ejecting heat exchanger component. The translation speed of platform 22 was often limited by bouncing of the component as it hit the receiving fixture. The additional throughput desired by increasing the translation speed of the platform would be offset by increased operator time to reposition misaligned components.

In the present invention, the movement of dispenser head 26 is controlled by controller 34 independently of the manner in which platform 22 translates. Furthermore, the movement of dispenser 26 is not limited to the shape and location of cam path 62 or to a constant rotational speed of wheel 60. In the preferred embodiment, component 28A is ejected at a velocity of approximately 1 foot per second at which time wheel 60 is spinning at approximately 450 revolutions per minute. Dispenser head 62 is moved up to reload with component 28B at a vertical velocity of approximately 1.7 feet per second, with wheel 60 rotating at approximately 750 revolutions per minute. The aforementioned linear and angular velocities are useful with a speed of platform 22 of about 0.44 feet per second, with open pitch spacing of 0.531 inches. Fixture 30 is located about 2 inches below head 26, as shown in FIG. 3. As another example, component 28A is ejected at a velocity of approximately 3 feet per second at which time wheel 60 is spinning at approximately 675 revolutions per minute. Dispenser head 62 is moved up to reload with component 28B at a vertical velocity of approximately 5 feet per second, with wheel 60 rotating at approximately 1125 revolutions per minute. The aforementioned linear and angular velocities are useful with a speed of platform 22 of about 0.54 feet per second, with open pitch spacing of 0.431 inches.

The present invention includes another advantage from control of motors 38 and 54 by electronic controller 34. Controller 34 accommodates receiving fixtures 30 which require different predetermined spacings of components. This accommodation can be accomplished by receipt of signals from input panel 36 into controller 34 as interpeted by software 100. For example, a first receiving fixture 30' may have an open pitch spacing between adjacent pickets 31 of 0.531 inches. Controller 34, knowing the position of dispenser head 26 along path 24 by means of resolver 52, deposits a component 28 every 0.531 inches of travel by platform 22.

A second receiving fixture 30" may have an open pitch spacing between adjacent pickets 31 of 0.431 inches. For this second fixture 30", controller 34 deposits a component 28 every 0.431 inches of travel by platform 22. A second electrical signal from controller 34 results in proper deposition of components 28 along fixture 30". For the case of deposition along fixture 30', controller 34 counts a greater number of pulses from resolver 52, and for deposition of components along fixture 30", controller 34 counts a lesser number of pulses from resolver 52.

In addition, controller 34 controls the rate at which dispenser head 26 translates across fixture 30. The rate of translation of head 26 relates to a period of time between consecutive pulses from resolver 52. Controller 34 includes an internal clock and appropriate hardware and software for timing the period. The rate at which head 26 translates is independently changeable electronically relative to the pitch spacing of fixture 30, and also relative to the ejection velocity and loading rate of head 26. In the most preferred embodiment, head 26 and platform 22 translate along path 24 at any rate between 0 and 10 inches per second.

In an alternative method of control, it is also possible that controller 34 translates across platform 22 in a variable manner between higher and lower rates of translation. For example, it is possible to slow the movement of platform 22 as dispenser head 26 reaches a predetermined position for component ejection. After component 28 has been released, platform 22 would move at a faster rate until the next predetermined position is reached. This would permit more accurate aiming of components onto fixture 30, thus permitting a higher ejection velocity without having component 28 bounce out of alignment.

The use of controller 34 to independently control motors 38 and 54 based on signals from resolvers 52 and 70, respectively, thus overcomes a problem in apparatuses of related art. Some related art machines used a combination of sprockets and gearing to mechanically link the releasing and loading action of dispenser 26 to the traversing of platform 22 along path 24. With such mechanical linkage, the deposition of components on a receiving fixture was mechanically fixed. Regardless of the rate at which the dispenser traversed across the receiving fixture, the components would be dispensed at positions predetermined mechanically by the gearing and other mechanical components. In order to change the predetermined positions of the components, which is necessary if the receiving fixture changes, a gear set or other mechanical linkage between the platform and the ejecting mechanism would also have to change. It is difficult and time consuming to change such gears, and also expensive to make a new set of gears. In the present invention, this pitch spacing is changeable electronically.

Figure 5:
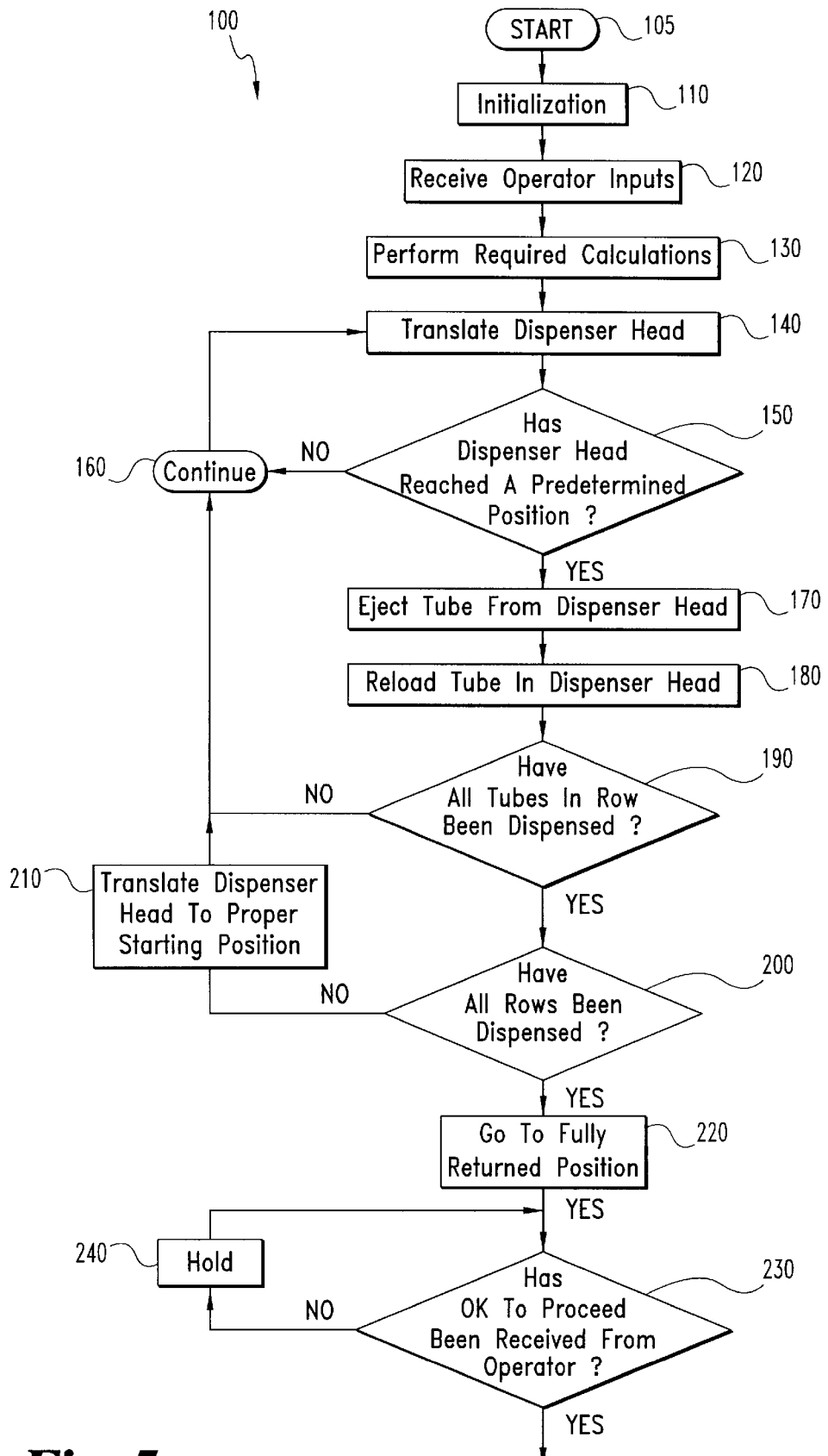
FIG. 5 is a flow chart for software useful with the present invention.
Figure 6:
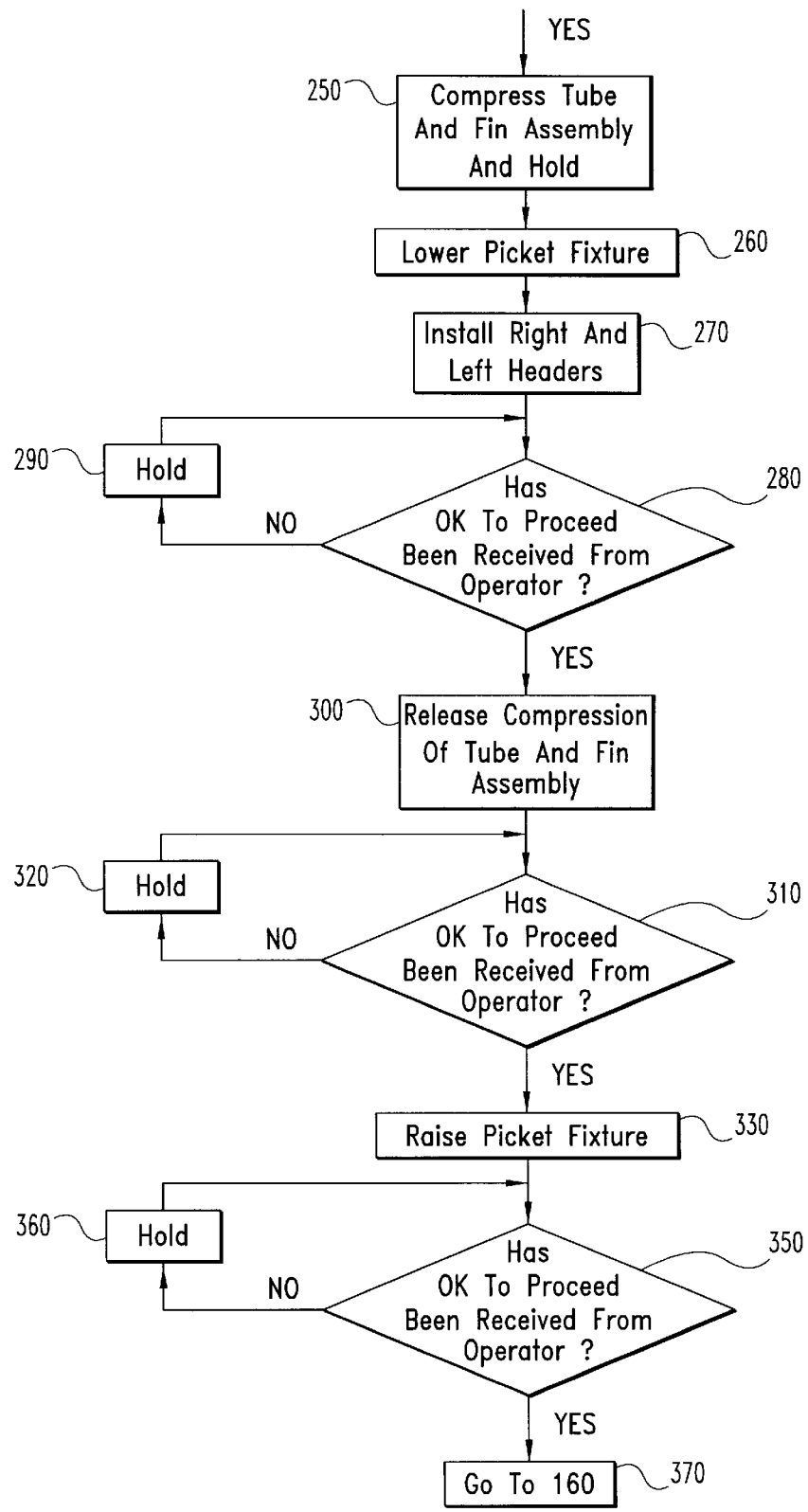
FIG. 6 is a continuation of the flowchart of FIG. 5.

The present invention incorporates software 100. FIGS. 5 and 6 represent a flow chart that includes some of the algorithms of the software.

In block 105, apparatus 20 responds to being provided with electrical power in a manner conventional for such machines. For example, controller 34 begins a power-up cycle that includes reading of memory, fault detection, and preparation of the internal memory structure of controller 34. In addition, various pneumatic devices are placed in a starting condition.

In block 110, apparatus 20 is cycled to a home position. For example, platform 22 is sent to a home position furthest from the human operator, at which position a counter internal to controller 34 used for reading resolver 52 is initialized. Wheel 60 is rotated by motor 54 to a home position as indicated by a unique position pulse of resolver 70.

In block 120, controller 34 receives commands and data from display and input panel 36. Through panel 36, the human operator can select a rate at which dispenser 26 traverses across fixture 30, the rate being selectable between 0 and 10 inches per second. The human operator also inputs a part number for the heat exchanger to be constructed, the part number corresponding to receiving fixture 30. Based on this part number, controller 34 can tell from its memory how many components 28 to dispense, at which predetermined positions to dispense components 28 along fixture 30, and how many rows of tubing are to be in the particular heat exchanger. For example, the heat exchanger may include two or more rows, in which case a first row would be deposited at predetermined positions, and then subsequent rows would be deposited on top of the first row. It may be necessary for the operator to perform certain functions in between insertion of rows, such as insertion of cooling fins between adjacent tubes in a given row. Controller 34 is also susceptible to interrupt commands from panel 36 during any moment of operation.

In block 130, controller 34 performs calculations necessary prior to dispensing components 28, including generation of the spacing signal that corresponds to the spacing of components on fixture 30. This spacing signal is generated from knowledge of the heat exchanger part number. Changing the part number may result in changing of the spacing signal. The operator selected platform speed is used to calculate the appropriate timing interval between pulses of resolver 52 that corresponds to component spacing. The term signal as used herein may refer to data or commands.

The operator selected translating speed of platform 22 and the part number dependent positions of components 28 along fixture 30 are both used to determine the appropriate rotational rates of dispenser motor 54, and signals corresponding to the rate of loading and ejection velocity are generated. Changing the translating speed or predetermined spacing may result in changing of the loading rate or ejection velocity signals. In the most preferred embodiment, motor 54 rotates wheel 60 from position B to A for loading of component 28 as quickly as possible. Wheel 60 is turned by motor 54 from position A to B for ejection of a component as slowly as possible, yet providing sufficient time to reload dispenser 26 prior to platform 22 reaching the next predetermined position.

In block 140, controller 34 commands dispenser head 26 to translate across fixture 30 at the operator selected rate. Controller 34 measures the time between consecutive pulses of resolver 52 to measure this speed. Controller 34 also counts the number of pulses received and calculates the position of head 26 along fixture 30.

In block 150, controller compares the position of head 26 to the predetermined positions of components for the particular part number of heat exchanger being built. If a predetermined position has not been reached, the controller 34 continues to translate dispenser head 26 as noted in block 160.

If a predetermined position has been reached, then block 170 is executed, and a component is ejected from the dispenser toward fixture 30. To accomplish this ejection, motor 54 rotates wheel 60 at the precalculated rate and ejects a component with the predetermined velocity. Controller 34 maintains the prescribed rotation of wheel 60 until ejection is complete. Controller 34 counts pulses of resolver 70 to determine when the ejection cycle is complete. Controller 34 measures the position change between consecutive pulses of resolver 52 to calculate and subsequently control the velocity of head 26.

In block 180, the next tube 28 is reloaded from the plurality of components in magazine 68 and into dispenser head 26. Controller 34 maintains a high speed of wheel 60 during reloading. Controller 34 counts the number of pulses of resolver 70 to determine when the reloading cycle is complete. In addition, sensor 70 or another sensor operably coupled to any of the moving apparatus of the ejecting mechanism can generate a unique signal to indicate that a cycle of the ejecting mechanism has been completed. For example, arm 66 could contact a limit switch, or wheel 60 could include a once-per-revolution marker. Ejection or release of tubes and reloading of tubes occur as platform 22 traverses past fixture 30.

In block 190, controller 34 compares the number of tubes dispensed in this particular row to the number tubes required for the particular part number. If more tubes need to be dispensed, controller 34 continues to translate the dispenser head to the next predetermined position for the next dispensing.

In block 200, controller 34 compares the number of rows of tubes that have been dispensed to the number of rows corresponding to the particular part number of the heat exchanger.

If additional rows of tubes are required, then in block 210, the dispenser head is translated to the proper starting position for the next row.

If all rows have been dispensed, then in block 220, controller 34 translates to the fully-returned position. In this position, platform 22 is at a point farthest from the human operator, permitting him access to deposited tubes 28 on fixture 30. The operator inserts any additional components required onto fixture 30. In the most preferred embodiment, a strip of corrugated sheet metal aluminum fins are inserted between each tube. While the operator is performing this work, controller 34 applies a pneumatically-operated brake to platform 22 to hold it in the fully returned position. The operator places a flat plate on top of the full complement of tubes and fins to help hold them in place.

In block 230, controller 34 continues to hold the position of platform 22 until receiving the proper input signal from the operator through the cycle start button.

In block 250, programmable logic controller 33 compresses the assembly of tubes and fins in a direction parallel to path 24. Controller 33 stops compressing the assembly when the appropriate signal has been received. In block 260, controller 33 lowers picket fixture 30 by an electromechanical actuator (not shown).

In block 270, controller 34 commands fixtures on either side of the compressed assembly to move inward. These fixtures, on the right and left-hand sides of the assembly as seen from the operator's position, have headers installed in them. Each of the tubes 28 slide through a corresponding opening in each header. Controllers 34 and 33 hold the positions of the various actuators. The operator installs several holding fixtures across the compressed assembly.

In block 280, controller 34 continues to hold its position until receiving the appropriate input signal from the operator through the cycle start button.

Upon receiving a release command, controller 33 executes block 300, releasing the state of compression on the tube and fin assembly. The assembly expands slightly, but is restrained from expanding by the holding fixtures. The operator can remove the assembly of tubes, fins, and headers by lifting the holding fixtures.

Block 330 is executed after controller 34 receives the appropriate command from the operator. Picket fixture 30 is raised into position for assembly of the next heat exchanger. Controller 34 maintains apparatus 20 in this state until receiving authorization to proceed from the operator. Upon receiving authorization to proceed, controller 34 returns to block 140 and repeats the aforementioned cycle.

While the invention has been illustrated and described in detail in the foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for assembling a heat exchanger, comprising:
   a plurality of components for a heat exchanger;
   a fixture for receiving said components;
   a means for dispensing said components onto said fixture, said dispensing means being traversable across said fixture; and
   an electronic controller operably coupled to said dispensing means such that said components are dispensed onto said fixture at predetermined positions;

wherein the predetermined positions are electronically changeable.

2. The apparatus of claim 1 wherein said components are tubes.

3. The apparatus of claim 1 wherein said controller includes memory.

4. The apparatus of claim 3 which further comprises a sensor for sensing by the controller of the position of the dispensing means traversing across said fixture.

5. An apparatus for assembling a heat exchanger, comprising:
   a plurality of components for a heat exchanger;
   a dispenser head for releasing said components;
   a means for translating said dispenser head at a predetermined rate;
   an electronic controller operably coupled to said dispenser head and said translating means, such that said components are released at predetermined positions as said dispenser head translates at the predetermined rate;
   wherein the predetermined positions and the predetermined rate are independently changeable electronically.

6. The apparatus of claim 5 wherein said components are tubes.

7. The apparatus of claim 5 wherein said controller includes memory.

8. The apparatus of claim 7 which further comprises a sensor for sensing by the controller of the predetermined positions.

9. An apparatus for assembling a heat exchanger, comprising:
   a plurality of components for a heat exchanger;
   a fixture for receiving said components;
   a platform;
   an ejecting mechanism coupled to said platform, said mechanism capable of ejecting said components with predetermined velocities;
   a motor for translating said platform across said fixture;
   can electronic controller operably coupled to said ejecting mechanism and said motor such that said controller initiates the ejection of said components to predetermined positions on said fixture with the predetermined velocities;
   wherein the predetermined positions and the predetermined velocities are independently changeable electronically.

10. The apparatus of claim 9 wherein said components are tubes.

11. The apparatus of claim 9 wherein said controller includes memory.

12. The apparatus of claim 11 which further comprises a platform sensor for sensing by the controller of the position of said platform.

13. The apparatus of claim 11 which further comprises an ejecting mechanism sensor useful by said controller in controlling the ejecting velocity.

14. An apparatus for assembling a heat exchanger, comprising:
   a plurality of components for a heat exchanger, said components releasably coupled to a dispenser, said dispenser capable of loading and releasing said components;
   an electronic controller operably coupled to said dispenser such that said controller initiates the release of said components at a first rate and initiates the loading of said components at a second rate, the first rate and second rate being independently selectable electronically; and
   a dispenser sensor providing a signal to said controller representative of the loading of one of said components.

15. The apparatus of claim 14 wherein said components are tubes.

16. The apparatus of claim 14 wherein said controller includes memory.

17. The apparatus of claim 4 wherein said sensor is a first resolver, and which further comprises a first electric motor controlled by said electronic controller, a rack gear, and a pinion gear, said pinion gear being driven by said first electric motor, said rack gear and said pinion gear being adapted and configured for traversing said dispensing means.

18. The apparatus of claim 17 wherein said dispensing means includes a second electric motor controlled by said electronic controller for dispensing said plurality of components and a second resolver for measuring the rotation of said second motor.

19. The apparatus of claim 1 wherein said components are releaseably coupled to said dispensing means, said dispensing means is capable of loading said components at a first rate and releasing said components at a second rate, and the first rate and the second rate are independently selectable electronically.

20. The apparatus of claim 1 wherein said dispensing means is traversable at a predetermined rate, and the predetermined rate and the predetermined positions are independently changeable electronically.

21. The apparatus of claim 1 wherein said dispensing means is capable of ejecting said components with predetermined velocities, and the predetermined positions and the predetermined velocities are independently changeable electronically.

22. The apparatus of claim 1 wherein said dispensing means traverses at a first rate as one of said plurality of a components is deposited at a first predetermined position and traverses at a second rate as said dispensing means moves to a second predetermined position adjacent to the first predetermined position, and the second rate is greater than the first rate.

23. The apparatus of claim 17 wherein said dispensing means is traversable at a predetermined rate, and the predetermined rate and the predetermined positions are independently changeable electronically.

24. The apparatus of claim 23 wherein said dispensing means includes a second electric motor controlled by said electronic controller for dispensing said plurality of components and a second resolver for measuring the rotation of said second motor, said dispensing means being capable of ejecting said components with predetermined velocities, and the predetermined positions and the predetermined velocities are independently changeable electronically.

25. The apparatus of claim 24 wherein said components are releaseably coupled to said dispensing means, said dispensing means being capable of loading said components at a first rate and releasing said components at a second rate, the first rate and the second rate being independently selectable electronically.

26. The apparatus of claim 8 wherein said sensor is a first resolver, and which further comprises a first electric motor controlled by said electronic controller, a rack gear, and a pinion gear, said pinion gear being driven by said first electric motor, said rack gear and said pinion gear being adapted and configured for translating said dispenser head.

27. The apparatus of claim 26 which further comprises a second electric motor controlled by said electronic controller for powering said dispenser head and a second resolver for measuring the rotation of said second motor.

28. The apparatus of claim 5 wherein said dispenser head is capable of ejecting said components with predetermined velocities, and the predetermined positions and the predetermined velocities are independently changeable electronically.

29. The apparatus of claim 5 wherein said dispenser head translates at a first rate as one of said plurality of a components is deposited at a first predetermined position and translates at a second rate as said dispenser head moves to a second predetermined position adjacent to the first predetermined position, and the second rate is greater than the first rate.

30. The apparatus of claim 26 wherein said dispenser head is capable of ejecting said components with predetermined velocities, and the predetermined positions and the predetermined velocities are independently changeable electronically.

31. The apparatus of claim 30 wherein said components are releaseably coupled to said dispenser head, said dispenser head being capable of loading said components at a first rate and releasing said components at a second rate, the first rate and the second rate being independently selectable electronically.

32. The apparatus of claim 12 wherein said platform sensor is a first resolver, and which further comprises a rack gear and a pinion gear, said pinion gear being driven by said motor, said rack gear and said pinion gear being adapted and configured for translating said platform.

33. The apparatus of claim 32 which further comprises a second motor operably coupled to said electronic controller for powering said ejecting mechanism and a second resolver for measuring the rotation of said second motor.

34. The apparatus of claim 9 wherein said platform is translatable at a predetermined rate, and the predetermined rate and the predetermined positions are independently changeable electronically.

35. The apparatus of claim 9 wherein said platform translates at a first rate as one of said plurality of a components is deposited at a first predetermined position and translates at a second rate as said platform moves to a second predetermined position adjacent to the first predetermined position, and the second rate is greater than the first rate.

36. The apparatus of claim 33 wherein said platform is translatable at a predetermined rate, and the predetermined rate and the predetermined positions are independently changeable electronically.

37. The apparatus of claim 14 wherein said dispenser includes a first electric motor operably coupled to said electronic controller for powering said dispenser.

38. The apparatus of claim 37 which further comprises a fixture for receiving said components, a second electric motor operably coupled to said electronic controller, a rack gear, and a pinion gear, said pinion gear being driven by said second electric motor, said rack gear and said pinion gear being adapted and configured for traversing said dispenser across said fixture, said controller initiating the release of said plurality of components at predetermined positions, the predetermined positions being electronically changeable.

39. The apparatus of claim 38 wherein said dispenser is traversable at a predetermined rate, and the predetermined rate and the predetermined positions are independently changeable electronically.

40. The apparatus of claim 38 wherein said dispenser traverses at a first rate as one of said plurality of a components is deposited at a first predetermined position and traverses at a second rate as said dispenser moves to a second predetermined position adjacent to the first predetermined position, and the second rate is greater than the first rate.

41. An apparatus for assembling a heat exchanger, comprising:

a plurality of components for a heat exchanger, said components releasably coupled to a dispenser, said dispenser capable of loading and releasing said components;

an electronic controller operably coupled to said dispenser such that said controller initiates the release of said components at a first rate and initiates the loading of said components at a second rate, the first rate and second rate being independently selectable electronically; and a dispenser sensor providing a signal to said controller representative of the first rate.

42. The apparatus of claim 41 which further comprises a fixture for receiving said components, a first electric motor operably coupled to said electronic controller for powering said dispenser, a second electric motor operably coupled to said electronic controller, a rack gear, and a pinion gear, said pinion gear being driven by said second electric motor, said rack gear and said pinion gear being adapted and configured for traversing said dispenser across said fixture, said controller initiating the release of said plurality of components at predetermined positions, the predetermined positions being electronically changeable.

43. The apparatus of claim 42 wherein said dispenser is traversable at a predetermined rate, and the predetermined rate and the predetermined positions are independently changeable electronically.

* * * * *